United States Patent
Xing et al.

(10) Patent No.: US 11,039,203 B2
(45) Date of Patent: Jun. 15, 2021

(54) CHANNEL CHANGING METHOD AND APPARATUS THEREOF

(71) Applicant: Huawei Technologies Co., Ltd., Shenzhen (CN)

(72) Inventors: Gang Xing, Shenzhen (CN); Zhibing Wang, Nanjing (CN); Zhigang Wei, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/564,432

(22) Filed: Sep. 9, 2019

(65) Prior Publication Data

US 2020/0007928 A1 Jan. 2, 2020

Related U.S. Application Data

(63) Continuation of application No. PCT/CN2018/076535, filed on Feb. 12, 2018.

(30) Foreign Application Priority Data

Mar. 13, 2017 (CN) .......................... 201710147526.6

(51) Int. Cl.
*H04N 21/438* (2011.01)
*H04N 21/6405* (2011.01)
(Continued)

(52) U.S. Cl.
CPC ..... *H04N 21/4384* (2013.01); *H04N 21/6405* (2013.01); *H04N 21/6408* (2013.01); *H04N 21/8352* (2013.01)

(58) Field of Classification Search
CPC ....... H04N 21/23106; H04N 21/23424; H04N 21/2343; H04N 21/234345;
(Continued)

(56) References Cited

U.S. PATENT DOCUMENTS 8,700,792 B2 * 4/2014 Hughes .............. H04N 21/6408
709/231
2004/0096196 A1 5/2004 Seo et al.
(Continued)

FOREIGN PATENT DOCUMENTS

CN 101072337 A 11/2007
CN 101212407 A 7/2008
(Continued)

OTHER PUBLICATIONS

Machine Translation and Abstract of Chinese Publication No. CN101212407, Jul. 2, 2008, 10 pages.
(Continued)

*Primary Examiner* — Farzana Hossain
(74) *Attorney, Agent, or Firm* — Conley Rose, P.C.

(57) ABSTRACT

A channel changing method and an apparatus thereof, where the method includes: sending, by a playback device to a fast channel change (FCC) server, a channel change request for a change to a target channel; receiving a low bit rate media stream of the target channel that is quickly sent by the FCC server, for playing; receiving, by the playback device, a source bit rate media stream of the target channel from a head end device when receiving a quick-sending end notification sent by the FCC server; and splicing, by the playback device, the source bit rate media stream of the target channel and the low bit rate media stream of the target channel and performing playing.

18 Claims, 9 Drawing Sheets

(51) Int. Cl.
*H04N 21/6408* (2011.01)
*H04N 21/8352* (2011.01)

(58) Field of Classification Search
CPC ... H04N 21/234354; H04N 21/234363; H04N 21/234381; H04N 21/2662; H04N 21/4384; H04N 21/6405; H04N 21/6408; H04N 21/6437; H04N 21/8352; H04N 21/8456; H04N 21/8547
See application file for complete search history.

(56) References Cited

U.S. PATENT DOCUMENTS

| | | | |
|---|---|---|---|
| 2005/0190781 A1* | 9/2005 | Green | H04N 5/50 370/432 |
| 2007/0266398 A1 | 11/2007 | Vandaele | |
| 2009/0064242 A1 | 3/2009 | Cohen et al. | |
| 2009/0245393 A1* | 10/2009 | Stein | H04N 21/44016 375/240.28 |
| 2010/0115566 A1 | 5/2010 | Haimi-Cohen | |
| 2010/0293587 A1 | 11/2010 | Haimi-Cohen et al. | |
| 2012/0030707 A1 | 2/2012 | Cedervall et al. | |
| 2013/0332974 A1* | 12/2013 | Lundqvist | H04N 21/6408 725/109 |
| 2014/0020040 A1 | 1/2014 | Liu | |
| 2014/0223502 A1 | 8/2014 | Doblmaier et al. | |
| 2015/0230003 A1 | 8/2015 | Shaw et al. | |
| 2018/0109824 A1 | 4/2018 | Su et al. | |
| 2018/0295411 A1* | 10/2018 | Xu | H04N 7/17318 |
| 2019/0082216 A1 | 3/2019 | Chen | |
| 2020/0007928 A1 | 1/2020 | Xing et al. | |

FOREIGN PATENT DOCUMENTS

| | | |
|---|---|---|
| CN | 101518082 A | 8/2009 |
| CN | 102970585 A | 3/2013 |
| CN | 104811790 A | 7/2015 |
| CN | 105144727 A | 12/2015 |
| CN | 105376613 A | 3/2016 |
| CN | 106454394 A | 2/2017 |
| CN | 106961625 A | 7/2017 |
| JP | 2009130732 A | 6/2009 |
| JP | 2012527164 A | 11/2012 |
| RU | 2328041 C2 | 6/2008 |
| WO | 2018001184 A1 | 1/2018 |

OTHER PUBLICATIONS

Machine Translation and Abstract of Chinese Publication No. CN102970585, Mar. 13, 2013, 12 pages.
Machine Translation and Abstract of Chinese Publication No. CN104811790, Jul. 29, 2015, 6 pages.
Machine Translation and Abstract of Japanese Publication No. JP2009130732, Jun. 11, 2009, 38 pages.
Machine Translation and Abstract of International Publication No. WO2018001184, Jan. 4, 2018, 23 pages.
Berger, E., et al., "Frame Marking RTP Header Extension," XP015109229, draft-ietf-avtext-framemarking-00, Oct. 19, 2015, 8 pages.
Fuchs, H., et al., "Optimizing channel change time in IPTV applications," XP031268571, IEEE International Symposium on Broadband Multimedia Systems and Broadcasting, Jun. 3, 2008, 8 pages.

* cited by examiner

CHANNEL CHANGING METHOD AND APPARATUS THEREOF

CROSS-REFERENCE TO RELATED APPLICATIONS

This application is a continuation of International Patent Application No. PCT/CN2018/076535, filed on Feb. 12, 2018, which claims priority to Chinese Patent Application No. 201710147526.6 filed on Mar. 13, 2017. The disclosures of the aforementioned applications are hereby incorporated by reference in their entireties.

TECHNICAL FIELD

The present disclosure relates to the field of internet protocol televisions (IPTV), and in particular, to a channel changing method and an apparatus thereof.

BACKGROUND

Usually, an IPTV system includes a head end device, a fast channel change (FCC) server, and a playback device, and the head end device includes an encoder and a media relay function (MRF).

In the IPTV system, a channel change time is a very important indicator related to user experience, and is a time period cost by the playback device from initiating channel changing to normally playing an I frame. A media stream is formed by three types of alternately arranged frames: I, B, and P frames, for example, IBBPBBPIBBPBBP. The playback device cannot separately perform decoding when receiving only B and P frames, and the playback device needs to start to perform decoding and play a picture only after receiving an I frame. The channel change time is related to all links such as media stream output of the head end device, processing of the FCC server, and buffering of the playback device.

Currently, in a typical channel change procedure, after sending, to the FCC server, a channel change request for a change to a target channel, the playback device receives and plays a unicast media stream of the target channel that is sent by the FCC server. From a perspective of a user, this channel change is completed. However, from a perspective of the playback device, this channel change is not completed. When the playback device receives a quick-sending end notification delivered by the FCC server, the playback device joins a multicast group, and receives a multicast media stream of the target channel that is sent by the head end device. This channel change is completed when the multicast media stream of the target channel is played.

In the foregoing channel change procedure, 400 milliseconds (ms) to 500 ms is consumed from a time point at which the FCC server starts to send the unicast media stream to the playback device to a time point at which the playback device decodes and plays the unicast media stream. This affects a channel change time to some extent.

SUMMARY

A technical problem to be resolved by embodiments of the present disclosure is to provide a channel changing method and an apparatus thereof, to improve channel change speed, reduce channel change time, and save bandwidth.

According to a first aspect, an embodiment of the present disclosure provides a channel changing method, including: sending, by a playback device to a fast channel change (FCC) server, a channel change request for a change to a target channel; receiving, by the playback device, a low bit rate media stream of the target channel that is quickly sent by the FCC server, for playing; receiving, by the playback device, a source bit rate media stream of the target channel from a head end device when receiving a quick-sending end notification sent by the FCC server; and splicing, by the playback device, the source bit rate media stream of the target channel and the low bit rate media stream of the target channel and performing playing.

According to the first aspect of the embodiments of the present disclosure, the low bit rate media stream quickly sent by the FCC server is received, such that a channel change speed can be improved, a channel change time can be reduced, and a bandwidth can be saved. The source bit rate media stream and the low bit rate media stream are spliced, such that smooth playing can be achieved, and user experience can be improved.

In a possible implementation, the head end device outputs at least a source bit rate media stream and a low bit rate media stream for a channel, and the FCC server buffers the low bit rate media stream, to provide the low bit rate media stream for the playback device when the FCC server receives the channel change request sent by the playback device. The head end device provides the source bit rate media stream for a device joining a multicast group.

In a possible implementation, the source bit rate media stream of the target channel and the low bit rate media stream of the target channel each include several data slices, the data slice includes several data packets, and the data packet includes initial packet detection information. A process of splicing, by the playback device, the source bit rate media stream of the target channel and the low bit rate media stream of the target channel and performing playing is: determining, by the playback device, a low bit rate alignment data slice and a source bit rate alignment data slice based on initial packet detection information of data packets of the source bit rate media stream of the target channel and the low bit rate media stream of the target channel that are currently received; and splicing, by the playback device behind a previous data slice of the low bit rate alignment data slice, the source bit rate media stream that is of the target channel and that starts from the source bit rate alignment data slice, and performing playing. In this possible implementation, alignment points in the two media streams are determined based on the initial packet detection information to achieve seamless splicing.

In a possible implementation, the initial packet detection information includes an initial packet identifier and a time stamp, and a process of determining, by the playback device, a low bit rate alignment data slice and a source bit rate alignment data slice based on initial packet detection information of data packets of the source bit rate media stream of the target channel and the low bit rate media stream of the target channel that are currently received includes: obtaining, by the playback device from the currently received source bit rate media stream of the target channel, a target data packet whose initial packet identifier is a preset initial packet identifier, a time stamp of the target data packet, and a target data slice to which the target data packet belongs; obtaining, by the playback device, a time stamp of the first data packet of the last data slice in the currently received low bit rate media stream of the target channel; and if the time stamp of the first data packet is the same as the time stamp of the target data packet, determining, by the playback device, the last data slice of the low bit rate media stream of the target channel as the low bit rate alignment data slice, and the target data slice as the source bit rate alignment data slice. In this possible implementation, data slices with a same initial packet time stamp are determined based on the initial packet identifier and the time stamp, to determine alignment points in the two media streams to achieve seamless splicing.

In a possible implementation, the playback device sends a sending stop notification to the FCC server when completing the splicing, where the sending stop notification is used to instruct the FCC server to stop sending the low bit rate media stream of the target channel to the playback device.

In a possible implementation, when the playback device receives the quick-sending end notification sent by the FCC server, the playback device applies to the head end device for joining a multicast group of the target channel, and receives the source bit rate media stream of the target channel from the head end device, in other words, receives the source bit rate media stream of the target channel that is multicast by the head end device.

According to a second aspect, an embodiment of the present disclosure provides a playback device, and the playback device has a function of implementing behavior of the playback device in the method according to the first aspect. The function may be implemented using hardware, or by executing corresponding software using hardware. The hardware or the software includes one or more modules corresponding to the foregoing function.

In a possible implementation, the playback device includes: a sending unit, configured to send, to an FCC server, a channel change request for a change to a target channel; a receiving unit, configured to receive a low bit rate media stream of the target channel that is quickly sent by the FCC server, for playing, where the receiving unit is further configured to receive a source bit rate media stream of the target channel from a head end device when receiving a quick-sending end notification sent by the FCC server; and a splicing and playback unit, configured to splice the source bit rate media stream of the target channel and the low bit rate media stream of the target channel and perform playing.

In another possible implementation, the playback device includes a transceiver and a processor. The transceiver is configured to send, to an FCC server, a channel change request for a change to a target channel. The transceiver is further configured to receive a low bit rate media stream of the target channel that is quickly sent by the FCC server, for playing. The transceiver is further configured to receive a source bit rate media stream of the target channel from a head end device when receiving a quick-sending end notification sent by the FCC server. The processor is configured to splice the source bit rate media stream of the target channel and the low bit rate media stream of the target channel and perform playing.

Based on a same disclosure concept, for a problem resolving principle and beneficial effects of the playback device, refer to the method and brought beneficial effects according to the first aspect, and for an implementation of the playback device, refer to an implementation of the method according to the first aspect. No repetition is provided again.

According to a third aspect, an embodiment of the present disclosure provides a channel changing method, including: receiving, by an FCC server, a channel change request sent by a playback device for a change to a target channel; quickly sending, by the FCC server, a low bit rate media stream of the target channel to the playback device at a preset high rate, and receiving a source bit rate media stream of the target channel from a head end device; splicing, by the FCC server, the source bit rate media stream of the target channel and the low bit rate media stream of the target channel, and quickly sending a spliced target media stream to the playback device; and sending, by the FCC server, a quick-sending end notification to the playback device, and sending the target media stream to the playback device at a preset normal rate, where the quick-sending end notification is used to instruct the playback device to receive the source bit rate media stream of the target channel from the head end device, and the preset high rate is higher than the preset normal rate.

According to the third aspect of the embodiments of the present disclosure, the low bit rate media stream is quickly sent to the playback device, such that a channel change speed can be improved, a channel change time can be reduced, and a bandwidth can be saved for the playback device.

In a possible implementation, the head end device outputs at least a source bit rate media stream and a low bit rate media stream for a channel, and the FCC server buffers the low bit rate media stream, to provide the low bit rate media stream for the playback device when the FCC server receives the channel change request sent by the playback device. The head end device provides the source bit rate media stream for a device joining a multicast group.

In a possible implementation, the FCC server sends the quick-sending end notification to the playback device in a time period in which a difference between a quick sending progress of the low bit rate media stream of the target channel and a live broadcast progress of the source bit rate media stream of the target channel is less than a threshold, in other words, sends the quick-sending end notification to the playback device when a quick sending progress of the low bit rate media stream of the target channel almost catches up with a live broadcast progress of the source bit rate media stream of the target channel, to instruct the playback device to immediately apply to the head end device for joining a multicast group of the target channel to receive the source bit rate media stream of the target channel from the head end device.

In a possible implementation, the FCC server receives a sending stop notification sent by the playback device, and stops sending the low bit rate media stream of the target channel to the playback device based on the sending stop notification.

According to a fourth aspect, an embodiment of the present disclosure provides an FCC server, and the FCC server has a function of implementing behavior of the FCC server in the method according to the third aspect. The function may be implemented using hardware, or by executing corresponding software using hardware. The hardware or the software includes one or more modules corresponding to the foregoing function.

In a possible implementation, the FCC server includes: a receiving unit, configured to receive a channel change request sent by a playback device for a change to a target channel; and a sending unit, configured to quickly send a low bit rate media stream of the target channel to the playback device at a preset high rate, where the sending unit is further configured to send a quick-sending end notification to the playback device, and the quick-sending end notification is used to instruct the playback device to receive a source bit rate media stream of the target channel from a head end device.

In another possible implementation, the FCC server includes a transceiver and a processor. The transceiver is configured to receive a channel change request sent by a playback device for a change to a target channel. The transceiver is further configured to quickly send a low bit rate media stream of the target channel to the playback device at a preset high rate. The transceiver is further configured to send a quick-sending end notification to the playback device, where the quick-sending end notification is used to instruct the playback device to receive a source bit rate media stream of the target channel from a head end device.

Based on a same disclosure concept, for a problem resolving principle and beneficial effects of the FCC server, refer to the method and brought beneficial effects according to the third aspect, and for an implementation of the FCC server, refer to an implementation of the method according to the third aspect. No repetition is provided again.

According to a fifth aspect, an embodiment of the present disclosure provides a channel changing method, including: receiving, by an FCC server, a channel change request sent by a playback device for a change to a target channel; quickly sending, by the FCC server, a low bit rate media stream of the target channel to the playback device at a preset high rate, and receiving a source bit rate media stream of the target channel from a head end device; splicing, by the FCC server, the source bit rate media stream of the target channel and the low bit rate media stream of the target channel, and quickly sending a spliced target media stream to the playback device at the preset high rate; and sending, by the FCC server, a quick-sending end notification to the playback device, and quickly sending the target media stream to the playback device at a preset normal rate, where the quick-sending end notification is used to instruct the playback device to receive the source bit rate media stream of the target channel from the head end device, and the preset high rate is higher than the preset normal rate.

According to the fifth aspect of the embodiments of the present disclosure, the spliced target media stream and the low bit rate media stream are quickly sent to the playback device, such that a channel change speed can be improved, a channel change time can be reduced, and a bandwidth can be saved for the playback device. The playback device does not need to be changed, but only the FCC server needs to be upgraded and reconstructed.

In a possible implementation, the head end device outputs at least a source bit rate media stream and a low bit rate media stream for a channel, and the FCC server buffers the low bit rate media stream, to provide the low bit rate media stream for the playback device when the FCC server receives the channel change request sent by the playback device. The head end device provides the source bit rate media stream for a device joining a multicast group.

In a possible implementation, the source bit rate media stream of the target channel and the low bit rate media stream of the target channel each include several data slices, the data slice includes several data packets, and the data packet includes initial packet detection information. A process of splicing, by the FCC server, the source bit rate media stream of the target channel and the low bit rate media stream of the target channel is: determining, by the FCC server, a low bit rate alignment data slice and a source bit rate alignment data slice based on initial packet detection information of data packets of the source bit rate media stream of the target channel and the low bit rate media stream of the target channel that are currently received; and splicing, by the FCC server behind a previous data slice of the low bit rate alignment data slice, the source bit rate media stream that is of the target channel and that starts from the source bit rate alignment data slice. In this possible implementation, alignment points in the two media streams are determined based on the initial packet detection information to achieve seamless splicing.

In a possible implementation, the initial packet detection information includes an initial packet identifier and a time stamp, and a process of determining, by the FCC server, a low bit rate alignment data slice and a source bit rate alignment data slice based on initial packet detection information of data packets of the source bit rate media stream of the target channel and the low bit rate media stream of the target channel that are currently received includes: obtaining, by the FCC server from the currently received source bit rate media stream of the target channel, a target data packet whose initial packet identifier is a preset initial packet identifier, a time stamp of the target data packet, and a target data slice to which the target data packet belongs; obtaining, by the FCC server, a time stamp of the first data packet of the last data slice in the currently received low bit rate media stream of the target channel; and if the time stamp of the first data packet is the same as the time stamp of the target data packet, determining, by the FCC server, the last data slice of the low bit rate media stream of the target channel as the low bit rate alignment data slice, and the target data slice as the source bit rate alignment data slice. In this possible implementation, data slices with a same initial packet time stamp are determined based on the initial packet identifier and the time stamp, to determine alignment points in the two media streams to achieve seamless splicing.

In a possible implementation, the FCC server sends the quick-sending end notification to the playback device in a time period, where an interval time between the time period and a quick sending completion time point of the source bit rate alignment data slice is less than a threshold, in other words, sends the quick-sending end notification to the playback device when or after quick sending of the source bit rate alignment data slice is completed, to instruct the playback device to immediately apply to the head end device for joining a multicast group of the target channel to receive the source bit rate media stream of the target channel from the head end device.

In a possible implementation, the FCC server receives a sending stop notification sent by the playback device, and stops, based on the sending stop notification, sending the target media stream to the playback device.

In a possible implementation, when the FCC server starts to quickly send the low bit rate media stream of the target channel to the playback device at the preset high rate or in a quick sending process, the FCC server applies to the head end device for joining the multicast group of the target channel, to receive the source bit rate media stream of the target channel from the head end device, in other words, to receive the source bit rate media stream of the target channel that is multicast by the head end device.

According to a sixth aspect, an embodiment of the present disclosure provides another FCC server, and the FCC server has a function of implementing behavior of the FCC server in the method according to the aspect. The function may be implemented using hardware, or by executing corresponding software using hardware. The hardware or the software includes one or more modules corresponding to the foregoing function.

In a possible implementation, the FCC server includes: a receiving unit configured to receive a channel change request sent by a playback device for a change to a target channel; a sending unit configured to quickly send a low bit rate media stream of the target channel to the playback device at a preset high rate, where the receiving unit is further configured to receive a source bit rate media stream of the target channel from a head end device; and a splicing unit configured to splice the source bit rate media stream of the target channel and the low bit rate media stream of the target channel, where the sending unit is further configured to quickly send a spliced target media stream to the playback device at the preset high rate; and the sending unit is further configured to send a quick-sending end notification to the playback device, and quickly send the target media stream to the playback device at a preset normal rate, where the quick-sending end notification is used to instruct the playback device to receive the source bit rate media stream of the target channel from the head end device, and the preset high rate is higher than the preset normal rate.

In another possible implementation, the FCC server includes a transceiver and a processor. The transceiver is configured to receive a channel change request sent by a playback device for a change to a target channel. The transceiver is further configured to quickly send a low bit rate media stream of the target channel to the playback device at a preset high rate, and receive a source bit rate media stream of the target channel from a head end device. The processor is configured to splice the source bit rate media stream of the target channel and the low bit rate media stream of the target channel. The transceiver is further configured to quickly send a spliced target media stream to the playback device at the preset high rate. The transceiver is further configured to send a quick-sending end notification to the playback device, and quickly send the target media stream to the playback device at a preset normal rate, where the quick-sending end notification is used to instruct the playback device to receive the source bit rate media stream of the target channel from the head end device, and the preset high rate is higher than the preset normal rate.

Based on a same disclosure concept, for a problem resolving principle and beneficial effects of the FCC server, refer to the method and brought beneficial effects according to the fifth aspect, and for an implementation of the FCC server, refer to an implementation of the method according to the fifth aspect. No repetition is provided again.

According to a seventh aspect, an embodiment of the present disclosure provides a channel changing method, including: sending, by a playback device to an FCC server, a channel change request for a change to a target channel; receiving, by the playback device, a low bit rate media stream of the target channel that is quickly sent by the FCC server, for playing; receiving and playing, by the playback device, a spliced target media stream sent by the FCC server; receiving, by the playback device, a source bit rate media stream of the target channel from a head end device when receiving a quick-sending end notification sent by the FCC server; and splicing, by the playback device, the source bit rate media stream of the target channel and the low bit rate media stream of the target channel and performing playing.

According to the seventh aspect of the embodiments of the present disclosure, the low bit rate media stream and the target media stream that are quickly sent by the FCC server are received, such that a channel change speed can be improved, a channel change time can be reduced, and a bandwidth can be saved.

In a possible implementation, a process of splicing, by the playback device, the source bit rate media stream of the target channel and the low bit rate media stream of the target channel and performing playing is: performing, by the playback device, splicing and playing based on data packet sequence numbers or time stamps of the target media stream and the source bit rate media stream of the target channel that are currently received. In this possible implementation, because the target media stream and the source bit rate media stream have a same bit rate, splicing may be directly performed based on the data packet sequence numbers.

In a possible implementation, the playback device sends a sending stop notification to the FCC server when completing the splicing, where the sending stop notification is used to instruct the FCC server to stop sending the low bit rate media stream of the target channel to the playback device.

According to an eighth aspect, an embodiment of the present disclosure provides another playback device, and the playback device has a function of implementing behavior of the playback device in the method according to the seventh aspect. The function may be implemented using hardware, or by executing corresponding software using hardware. The hardware or the software includes one or more modules corresponding to the foregoing function.

In a possible implementation, the playback device includes: a sending unit configured to send, to an FCC server, a channel change request for a change to a target channel; a receiving unit configured to receive a low bit rate media stream of the target channel that is quickly sent by the FCC server, for playing, where the receiving unit is further configured to receive a spliced target media stream sent by the FCC server for playing, and the receiving unit is further configured to receive a source bit rate media stream of the target channel from a head end device when receiving a quick-sending end notification sent by the FCC server; and a splicing and playback unit configured to splice the source bit rate media stream of the target channel and the low bit rate media stream of the target channel and perform playing.

In a possible implementation, the playback device includes a transceiver and a processor. The transceiver is configured to send, to an FCC server, a channel change request for a change to a target channel. The transceiver is further configured to receive a low bit rate media stream of the target channel that is quickly sent by the FCC server, for playing. The transceiver is further configured to receive a spliced target media stream sent by the FCC server for playing. The transceiver is further configured to receive a source bit rate media stream of the target channel from a head end device when receiving a quick-sending end notification sent by the FCC server. The processor is configured to splice the source bit rate media stream of the target channel and the low bit rate media stream of the target channel and perform playing.

Based on a same disclosure concept, for a problem resolving principle and beneficial effects of the playback device, refer to the method and brought beneficial effects according to the seventh aspect, and for an implementation of the playback device, refer to an implementation of the method according to the seventh aspect. No repetition is provided again.

According to a ninth aspect, an embodiment of the present disclosure provides a computer-readable storage medium, including an instruction, and when the instruction is run on a computer, the computer is enabled to perform the channel changing method according to the first aspect or the seventh aspect.

According to a tenth aspect, an embodiment of the present disclosure provides a computer-readable storage medium, including an instruction, and when the instruction is run on a computer, the computer is enabled to perform the channel changing method according to the third aspect or the fifth aspect.

According to the embodiments of the present disclosure, a channel change speed can be improved, a channel change time can be reduced, and a bandwidth can be saved.

BRIEF DESCRIPTION OF DRAWINGS

To describe the technical solutions in the embodiments of the present disclosure more clearly, the following briefly describes the accompanying drawings required for describing the embodiments of the present disclosure.

DESCRIPTION OF EMBODIMENTS

The following describes the embodiments of the present disclosure with reference to the accompanying drawings in the embodiments of the present disclosure.

Figure 1:
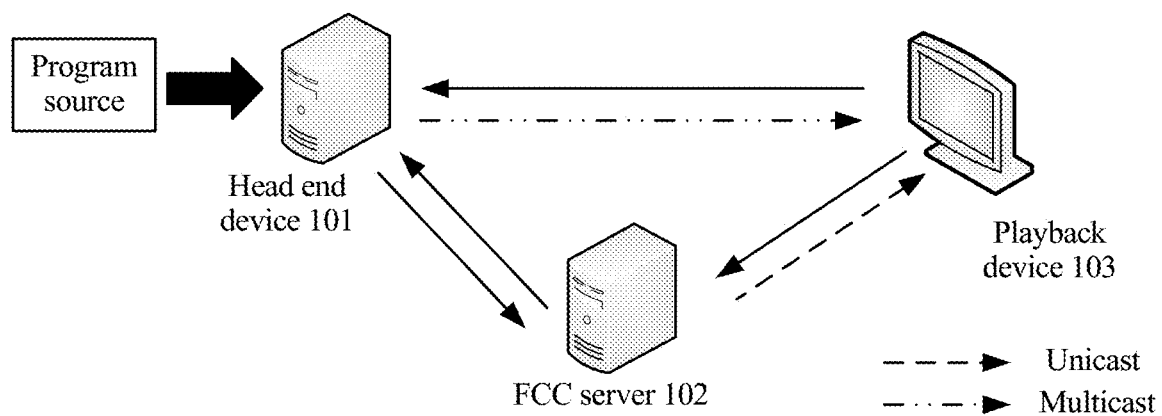
FIG. 1 is a schematic architectural diagram of a system to which an embodiment of the present disclosure is applied.

FIG. 1 is a schematic diagram of a system architecture to which an embodiment of the present disclosure is applied. The system architecture may be a system architecture of an IPTV system, and includes a program source, a head end device 101, an FCC server 102, and a playback device 103. It should be noted that, quantities and forms of the head end device, the FCC server, and the playback device in the schematic diagram of the system architecture shown in FIG. 1 do not constitute any limitation on this embodiment of the present disclosure.

The head end device 101 includes a media relay function (MRF) and an encoder. The head end device 101 obtains media content of a channel from the program source, compresses and encodes the media content, and converts the media content into a media file or a media stream that meets an IPTV service format requirement. The encoder compresses, encodes (e.g., encodes at an adaptive bit rate (ABR)), and encapsulates the media content of the channel that is obtained from the program source, and the MRF module performs real-time transport protocol (RTP) encapsulation on the media content processed by the encoder.

The head end device 101 multicasts the media stream to the FCC server 102 and the playback device 103. In this embodiment of the present disclosure, the head end device 101 compresses, encodes, encapsulates, converts, and performs other processing on media content of a channel to obtain at least two media streams, including a low bit rate media stream and a source bit rate media stream. The head end device 101 may output at least two media streams, namely, the low bit rate media stream and the source bit rate media stream, for the channel. Definition of the source bit rate media stream is related to network quality of the playback device 103. Higher network quality indicates higher definition of the source bit rate media stream, and lower network quality indicates lower definition of the source bit rate media stream. A bit rate of the low bit rate media stream is much lower than that of the source bit rate media stream. For example, the bit rate of the low bit rate media stream is even lower than 45% of that of the source bit rate media stream.

Figure 2:
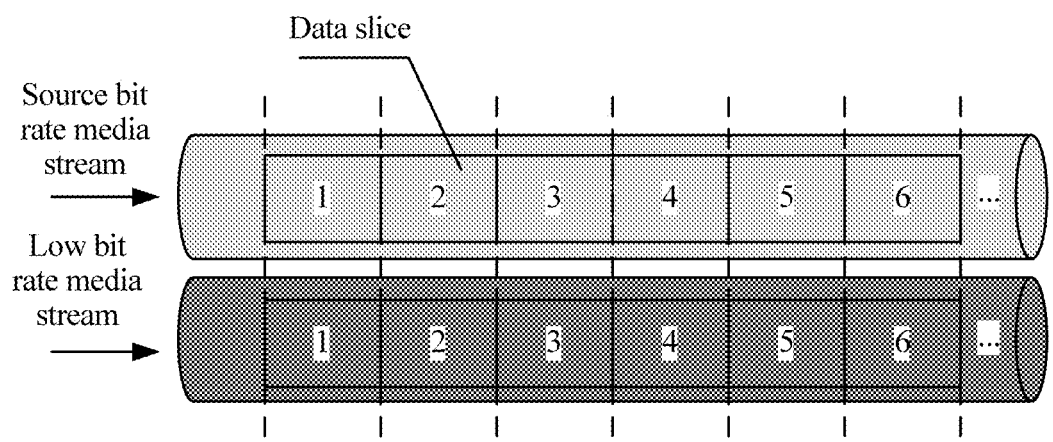
FIG. 2 is a schematic diagram of slices of media streams according to an embodiment of the present disclosure.

At least two media streams of a channel have a same slice time and have slice boundaries that are aligned, to ensure that the playback device or the FCC server seamlessly splices a low bit rate media stream and a source bit rate media stream of the channel. FIG. 2 is a schematic diagram of slices of media streams according to an embodiment of the present disclosure, and shows a case of slices of two media streams that can be output by the head end device 101. A source bit rate media stream and a low bit rate media stream each are divided into several data slices. In FIG. 2, only data slices numbered 1 to 6 are used as an example. A data slice numbered 1 is not necessarily the first data slice of a media stream. In FIG. 2, slice sizes of all the data slices of the source bit rate media stream and the low bit rate media stream are the same, and it indicates that the source bit rate media stream and the low bit rate media stream have a same slice time. Slice boundaries of both a light gray data slice 1 and a dark gray data slice 1 are on dotted lines, and it indicates that slice boundaries of the source bit rate media stream and the low bit rate media stream are aligned. In other words, the source bit rate media stream and the low bit rate media stream are synchronously sliced based on the same slice time. A specific value of the slice time is set by the head end device 101, and the specific value is not limited herein. For example, the slice time is 2 s by default. In other words, a slice size of each data slice is 2 s. It may be understood that, the schematic diagram of slices shown in FIG. 2 is obtained through processing by the encoder.

Figure 3:
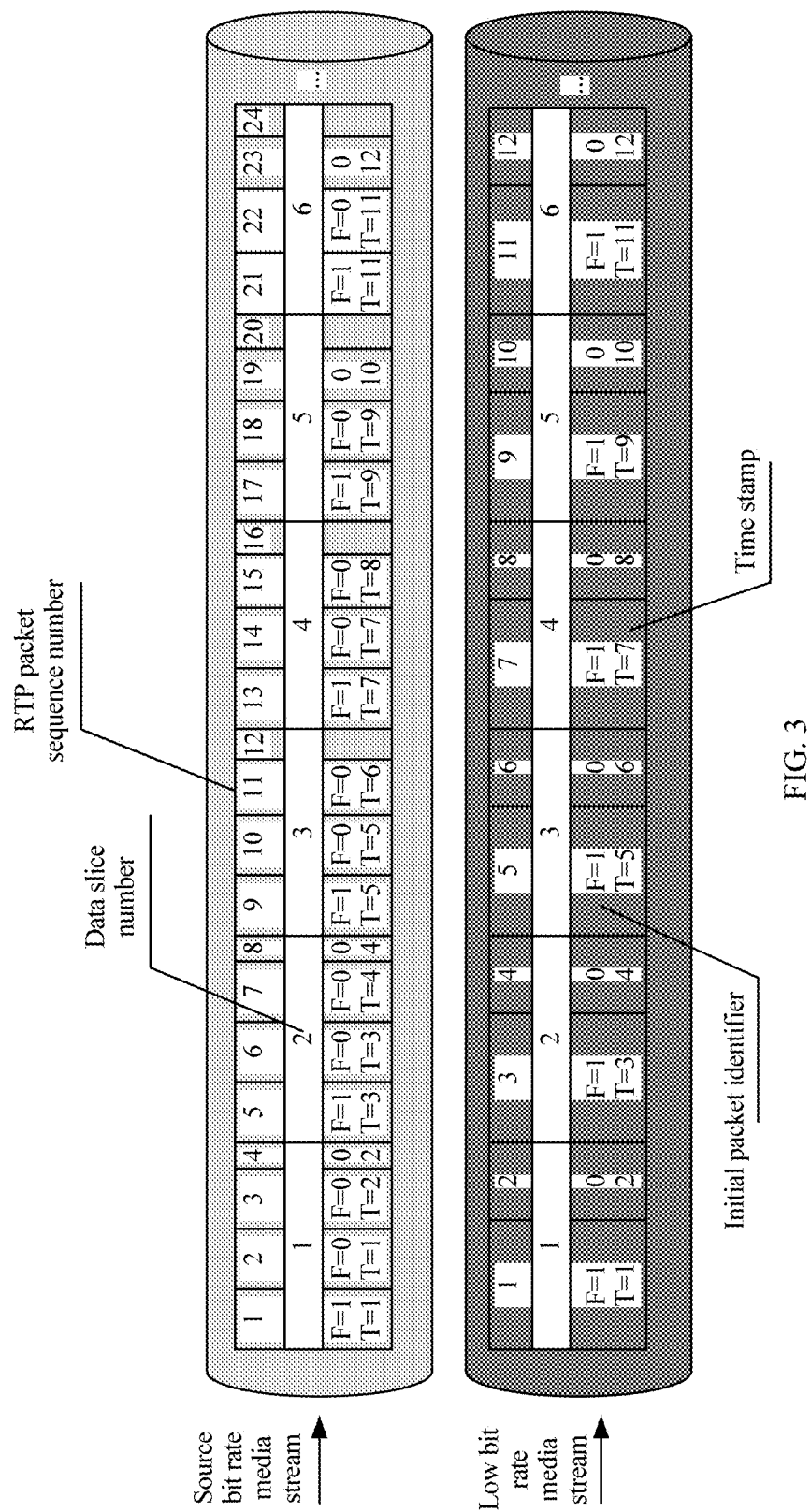
FIG. 3 is a schematic diagram of media stream encapsulation according to an embodiment of the present disclosure.

FIG. 3 is a schematic diagram of media stream encapsulation according to an embodiment of the present disclosure, and is a schematic diagram of Real-time Transport Protocol (RTP) encapsulation of a source bit rate media stream and a low bit rate media stream. Bit rates of the source bit rate media stream and the low bit rate media stream are different. Therefore, a quantity of RTP packets included in a data slice in the source bit rate media stream is different from a quantity of RTP packets included in a data slice in the low bit rate media stream. As shown in FIG. 3, a data slice in the source bit rate media stream includes four RTP packets, and a data slice in the low bit rate media stream includes two RTP packets. In this embodiment of the present disclosure, in an RTP encapsulation process, the MRF extends a header of an RTP packet with two fields to identify whether the RTP packet is the first RTP packet of a data slice. The two fields include an initial packet identifier field and a time stamp field. The initial packet identifier field is "F" shown in FIG. 3, and an RTP packet with "F=1" indicates that the RTP packet is the first RTP packet of a data slice. The time stamp field may be a trunk time stamp field, namely, "T" shown in FIG. 3. It should be noted that, the schematic diagram of encapsulation shown in FIG. 3 is merely an example, and does not constitute any limitation on this embodiment of the present disclosure. It may be understood that, the schematic diagram of encapsulation shown in FIG. 3 is obtained through processing by the MRF and output by the head end device 101.

For a case in which an amount of remaining data in a data slice is less than an RTP packet, the MRF adds "0" after normal data, and marks a valid data length in a header of the RTP packet to facilitate boundary alignment. For example, a valid data length of an RTP packet 2 of a data slice 1 in the low bit rate media stream shown in FIG. 3 is 2.

The FCC server 102 is configured to buffer a media stream of a channel, and unicast the media stream to the playback device 103. In this embodiment of the present disclosure, the FCC server 102 is configured to buffer low bit rate media streams of all channels, and unicast the low bit rate media streams to the playback device 103; and is further configured to receive a source bit rate media stream from the head end device 101, splice the source bit rate media stream and the low bit rate media stream, and unicast a spliced media stream to the playback device 103.

The playback device 103 may receive the source bit rate media stream multicast by the head end device 101, or may receive the low bit rate media stream unicast by the FCC server 102, or may receive the spliced media stream unicast by the FCC server 102, or may splice the source bit rate media stream and the low bit rate media stream. The playback device 103 plays a received media stream, such that a user can obtain media content.

Optionally, the schematic architectural diagram of the system shown in FIG. 1 further includes a scheduling device, configured to record an address of the FCC server 102, and provides a playback device with an address of an FCC server corresponding to a channel.

A channel changing method and an apparatus thereof provided in the embodiments of the present disclosure may be applied to an IPTV scenario. An FCC server quickly sends a low bit rate media stream, such that a playback device can complete buffering within a shorter period of time and perform stable playing, to improve a channel change speed, reduce a channel change time, and save a bandwidth. With popularity of a 4 k ultra high definition format, a dynamic adaptive streaming over hypertext transfer protocol (HTTP) (Dynamic Adaptive Streaming over HTTP (DASH)) encoding format starts to be popular. The embodiments of the present disclosure may further be applied to a DASH ABR scenario, and similarly, a channel change speed can be improved and a bandwidth can be saved.

The playback device in the embodiments of the present disclosure may be a digital television receiving terminal, an intelligent playback terminal, a smart television integrated with a set top box (STB) function, or the like.

Figure 4:
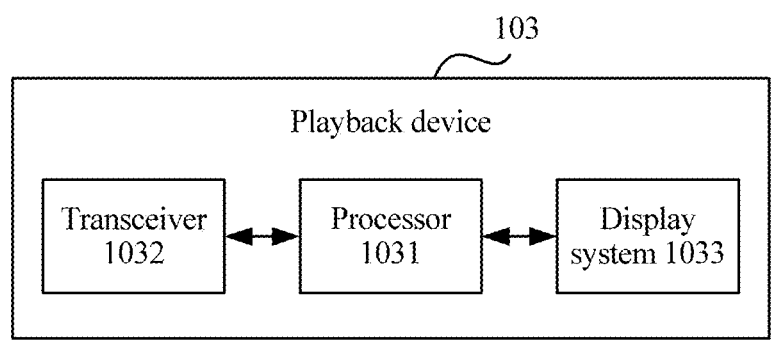
FIG. 4 is a schematic structural diagram of an entity of a playback device according to an embodiment of the present disclosure.

FIG. 4 is a schematic structural diagram of an entity of a playback device according to an embodiment of the present disclosure. The playback device 103 shown in FIG. 4 includes a processor 1031, a transceiver 1032, and a display system 1033. It should be noted that, the schematic structural diagram shown in FIG. 4 does not constitute any limitation on this embodiment of the present disclosure. During actual application, the playback device may alternatively include other components, such as a memory, an input device, and an audio system.

The processor 1031 may be a controller, a central processing unit (CPU), a general purpose processor, a digital signal processor (DSP), an application-specific integrated circuit (ASIC), a field programmable gate array (FPGA), another programmable logic device, a transistor logic device, a hardware component, or any combination thereof. The processor 1031 may implement or execute various example logic blocks, modules, and circuits described with reference to content disclosed in the embodiments of the present disclosure. Alternatively, the processor 1031 may be a combination of processors implementing a computing function, for example, a combination of one or more microprocessors, or a combination of the DSP and a microprocessor.

The transceiver 1032 may be a communications module or a transceiver circuit, configured to receive a media stream, data, an instruction, or the like sent by another device, and send a request, data, or the like to the other device, to implement communication between the playback device and the other device.

The display system 1033 may be a liquid crystal display (LCD), a light emitting diode (LED) display device, a cathode ray tube (CRT) display device, or the like, configured to output and display a media stream, and present a picture to a user.

In this embodiment of the present disclosure, the media stream received by the transceiver 1032 is correspondingly processed by the processor 1031, and finally output and displayed by the display system 1033.

Figure 5:
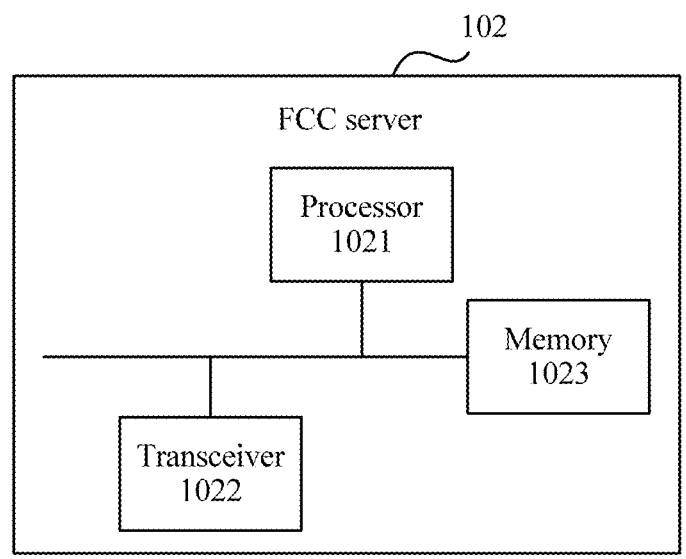
FIG. 5 is a schematic structural diagram of an entity of an FCC server according to an embodiment of the present disclosure.

FIG. 5 is a schematic structural diagram of an entity of an FCC server according to an embodiment of the present disclosure. The FCC server 102 shown in FIG. 5 includes a processor 1021, a transceiver 1022, and a memory 1023. It should be noted that, the schematic structural diagram shown in FIG. 5 does not constitute any limitation on this embodiment of the present disclosure. During actual application, the FCC server may alternatively include other components.

The processor 1021 may be a controller, a CPU, a general purpose processor, a DSP, an ASIC, an FPGA, another programming logic device, a transistor logic device, a hardware component, or any combination thereof. The processor 1021 may implement or execute various example logic blocks, modules, and circuits described with reference to content disclosed in the embodiments of the present disclosure. Alternatively, the processor 1021 may be a combination of processors implementing a computing function, for example, a combination of one or more microprocessors, or a combination of the DSP and a microprocessor.

The transceiver 1022 may be a communications module or a transceiver circuit, configured to receive a media stream sent by the head end device 101, send a request to the head end device 101, receive a request sent by the playback device 103, and send a media stream to the playback device 103, to implement communication among the FCC server, the head end device, and the playback device.

The memory 1023 may be a read-only memory (ROM) or another type of static storage device that can store static information and an instruction, a random access memory (RAM) or another type of dynamic storage device that can store information and an instruction, or may be an electrically erasable programmable read-only memory (EEPROM), a compact disc read-only memory (CD-ROM) or another optical disc storage, a disc storage (including a compact disc, a laser disc, an optical disc, a digital versatile disc, a Blu-ray disc, or the like), a magnetic disk storage medium, another magnetic disk storage device, or any other accessible medium that can be configured to carry or store expected program code in an instruction or data structure form, but is not limited thereto. The memory 1023 may exist independently, or may be integrated with the processor 1021.

In this embodiment of the present disclosure, the memory 1023 is configured to store program code for executing the embodiments of the present disclosure, and the execution is controlled by the processor 1021. The processor 1021 is configured to execute the program code stored in the memory 1023.

The following describes names used in the embodiments of the present disclosure.

Unicast is one of most basic functions of a media stream server, and refers to sending data from a single point to a single point. In the embodiments of the present disclosure, an FCC server unicasts a media stream to a playback device.

Multicast (or Multi Cast) refers to sending same data from a single point to a plurality of points in a transmission control protocol (TCP)/internet protocol (IP). A transmitter needs to send only a multicast user datagram protocol (UDP) packet to a multicast IP address, and then a router in a network copies the data and delivers the data to a receiver that is interested in the data. A workload of the transmitter remains unchanged regardless of a quantity of receivers. In addition, a volume of data in the network can be minimized through multicasting. This feature makes multicast very suitable for channel data transmission. If the network supports a multicast protocol, a playback device may apply for joining a multicast group and directly receive a multicast media stream sent by a head end device, to greatly reduce a workload of an FCC server and reduce network traffic consumption. In the embodiments of the present disclosure, the head end device multicasts a media stream to the playback device and the FCC server.

A channel refers to a band of a specific radio broadcast frequency or another radio communication frequency. In the embodiments of the present disclosure, the channel is a live broadcast channel.

The following describes in detail the channel changing method provided in the embodiments of the present disclosure with reference to FIG. 6 to FIG. 9. It should be noted that, a precondition of the embodiments of the present disclosure is as follows: The FCC server continuously receives a low bit rate media stream from the head end device, and locally buffers the low bit rate media stream for a period of time. A specific value of this period of time is set by a manufacturer of the FCC server and is not limited herein.

Figure 6:
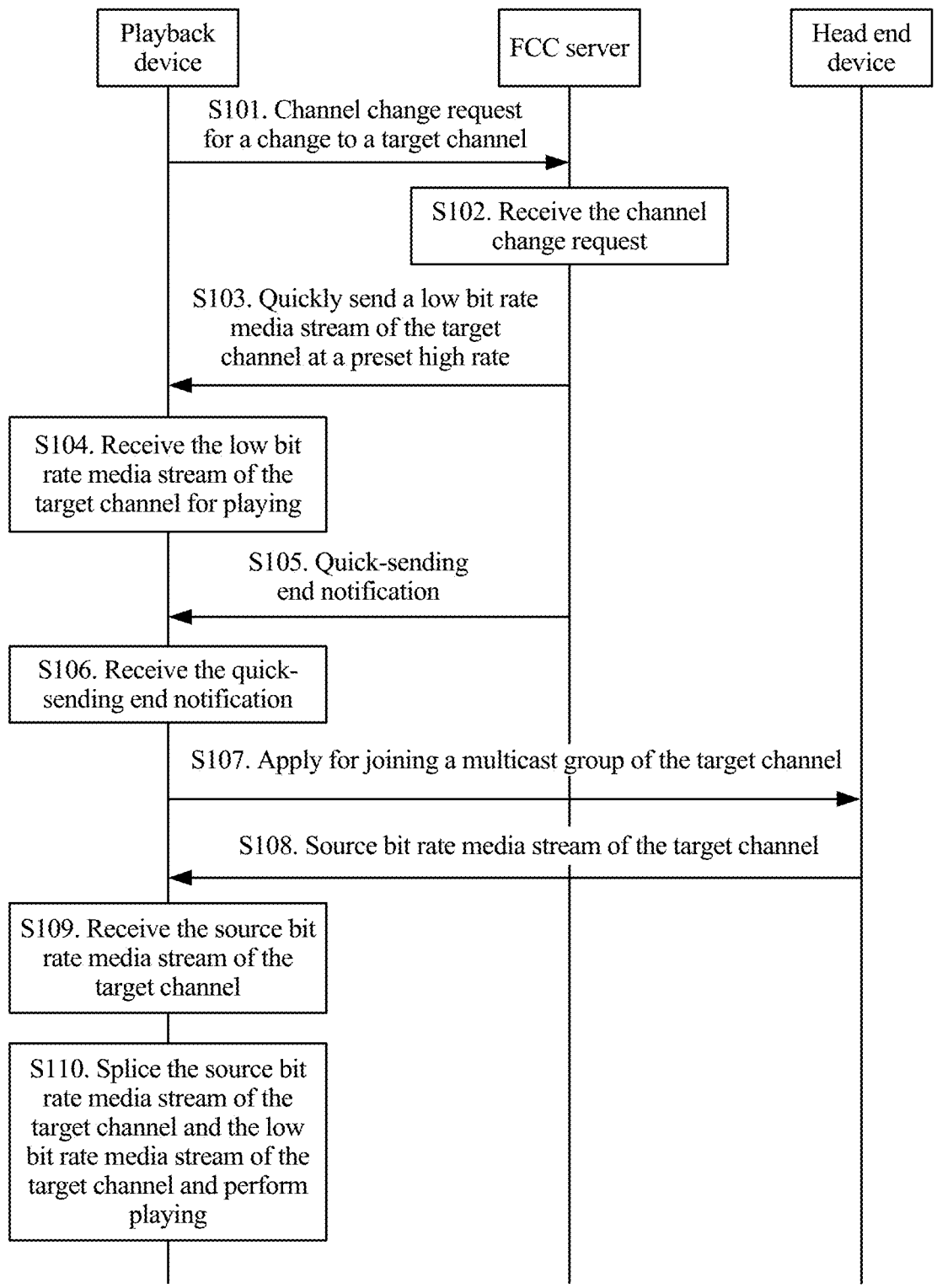
FIG. 6 is a schematic flowchart of a channel changing method according to Embodiment 1 of the present disclosure.

FIG. 6 is a schematic flowchart of a channel changing method according to Embodiment 1 of the present disclosure. The method includes but is not limited to the following steps.

Step S101: A playback device sends, to an FCC server, a channel change request for a change to a target channel.

For example, when receiving a channel change instruction on a change to the target channel, the playback device sends, to the FCC server, the channel change request for a change to the target channel. The target channel is a target live broadcast channel.

The channel change instruction may be entered by a user using an input apparatus of the playback device, for example, entered using an apparatus such as a remote control, a mouse, an STB (the STB is separated from a television), or a touch panel.

The channel change request is used to request the FCC server to provide the playback device with a low bit rate media stream of the target channel that is locally buffered by the FCC server.

Optionally, before sending the channel change request to the FCC server, the playback device obtains, using a scheduling device, an address of the FCC server or an address of an FCC server corresponding to the target channel. If the playback device obtains the address of the FCC server, the playback device sends the channel change request to the FCC server.

Step S102: The FCC server receives the channel change request.

For example, the FCC server receives the channel change request, obtains an identifier of the target channel, and reads a latest complete data slice of the target channel from the locally buffered low bit rate media stream based on the identifier of the target channel. The complete data slice includes an I frame. The complete data slice is obtained for seamless splicing that can be subsequently performed by the playback device.

Step S103: The FCC server quickly sends a low bit rate media stream of the target channel to the playback device at a preset high rate.

For example, the FCC server determines the low bit rate media stream starting from the complete data slice as the low bit rate media stream of the target channel to be sent to the playback device. The low bit rate media stream of the target channel is buffered by the FCC server. Therefore, there is a time difference between the low bit rate media stream of the target channel and a source bit rate media stream of the target channel multicast by a head end device. Therefore, the FCC server needs to quickly send the low bit rate media stream of the target channel to the playback device at the preset high rate, to catch up with the source bit rate media stream of the target channel sent by the head end device.

For example, the preset high rate is three times a sending rate of the head end device. Currently, a rate at which the FCC server quickly sends a media stream to the playback device through unicasting is 1·N times the sending rate of the head end device. A value of N is related to a bandwidth. Usually, the value of N is 3. In other words, quick sending is performed through unicasting at a 1.3× rate. Therefore, use of the 3× high rate can improve a channel change speed and reduce a channel change time. A bit rate of the low bit rate media stream is even lower than 45% of that of the source bit rate media stream, 3*0.45=1.35, and 1.35 is close to 1.3. Therefore, a bandwidth occupied by quick sending at a 1.35× rate is almost the same as a bandwidth occupied by quick sending at the 1.3× rate. However, when the quick sending is performed at the 1.3× rate, a bit rate of the quickly sent media stream is the same as that of the media stream sent by the head end device. In addition, when the quick sending is performed at the 1.35× rate in Embodiment 1 of the present disclosure, the quickly sent media stream is the low bit rate media stream, and has a bit rate lower than that of the source bit rate media stream sent by the head end device. Therefore, in Embodiment 1 of the present disclosure, a bandwidth can be further saved.

Step S104: The playback device receives the low bit rate media stream of the target channel that is quickly sent by the FCC server, for playing.

For example, when receiving the low bit rate media stream of the target channel that is quickly sent by the FCC server, the playback device performs operations such as buffering, re-arrangement, descrambling, decoding, and I-frame playing, to achieve stable playing. From a perspective of a user, this channel change is completed. In other words, when viewing media content of the target channel, the user considers that a change to the target channel already succeeds. However, the media content played by the playback device at this moment is the low bit rate media stream provided by the FCC server. Consequently, visual experience is not good. In addition, the FCC server cannot always send the low bit rate media stream to the playback device. Therefore, the playback device needs to receive the source bit rate media stream of the target channel from the head end device, to provide better experience for the user.

Step S105: The FCC server sends a quick-sending end notification to the playback device.

For example, the rate at which the FCC server performs quick sending to the playback device is higher than a rate at which the head end device performs sending to the playback device. Therefore, the FCC server sends the quick-sending end notification to the playback device when a quick sending progress of the low bit rate media stream of the target channel almost catches up with a live broadcast progress of the source bit rate media stream of the target channel. The quick-sending end notification is used to inform the playback device that the quick sending of the low bit rate media stream of the target channel is about to end, and instruct the playback device to immediately apply to the head end device for joining a multicast group of the target channel, to receive the source bit rate media stream of the target channel from the head end device.

A time period in which the quick sending progress of the low bit rate media stream of the target channel almost catches up with the live broadcast progress of the source bit rate media stream of the target channel may be referred to as a preset time period. A time point at which the quick sending progress of the low bit rate media stream of the target channel catches up with the live broadcast progress of the source bit rate media stream of the target channel may be determined according to a pursuit problem algorithm in mathematics. A period of time before the time point at which the catching up can be achieved is the preset time period. A specific value of this period of time is set by a manufacturer of the FCC server and is not limited herein.

Optionally, the preset time period is a time period in which a difference between the quick sending progress of the low bit rate media stream of the target channel and the live broadcast progress of the source bit rate media stream of the target channel is less than a threshold. A specific value of the threshold is set by the manufacturer of the FCC server and is not limited herein. The quick sending progress may be understood as a frame that is being quickly sent, and the live broadcast progress may be understood as a frame on which live broadcasting is being performed.

Step S106: The playback device receives the quick-sending end notification.

For example, the playback device receives the quick-sending end notification sent by the FCC server.

Step S107: The playback device applies to the head end device for joining the multicast group of the target channel.

For example, when receiving the quick-sending end notification, the playback device immediately applies to the head end device for joining the multicast group of the target channel. The playback device may send, to the head end device, a join request for joining the multicast group of the target channel, to apply for joining the multicast group of the target channel.

Step S108: The head end device sends the source bit rate media stream of the target channel to the playback device.

For example, when receiving the join request, the head end device adds the playback device to the multicast group of the target channel, and multicasts the source bit rate media stream of the target channel to the playback device.

Step S109: The playback device receives the source bit rate media stream of the target channel.

For example, after joining the multicast group of the target channel, the playback device receives the source bit rate media stream of the target channel from the head end device.

Step S110: The playback device splices the source bit rate media stream of the target channel and the low bit rate media stream of the target channel and performs playing.

For example, the playback device splices the source bit rate media stream of the target channel and the low bit rate media stream of the target channel that are currently received and performs playing. Further, a currently received media stream is a media stream that is currently received but not played.

It can be learned from FIG. 2 and FIG. 3 that, the source bit rate media stream of the target channel and the low bit rate media stream of the target channel that are shown include data slices, the data slice includes a data packet (e.g., RTP packet), the data packet includes initial packet detection information, and the initial packet detection information includes an initial packet identifier and a time stamp. The initial packet detection information is two extended fields in a header of an RTP packet, the initial packet identifier is "F" shown in FIG. 3, and the time stamp is "T" shown in FIG. 3.

Currently, the FCC server quickly sends the media stream through unicasting and the head end device sends the media stream through multicasting. Therefore, the playback device may perform splicing based on RTP packet sequence numbers. However, in Embodiment 1 of the present disclosure, RTP packets having a same RTP sequence number do not belong to a same data slice. For example, an RTP packet that has an RTP packet sequence number 9 in the source bit rate media stream shown in FIG. 3 belongs to a data slice 3, but an RTP packet that has an RTP packet sequence number 9 in the low bit rate media stream belongs to a data slice 5. Therefore, the playback device cannot perform splicing based on the RTP packet sequence numbers, but can perform splicing based on initial packet detection information of the two media streams.

First, the playback device determines a low bit rate alignment data slice and a source bit rate alignment data slice based on the initial packet detection information of the source bit rate media stream of the target channel and the low bit rate media stream of the target channel that are currently received. The FCC server obtains, from the currently received source bit rate media stream of the target channel, a target data packet whose initial packet identifier is a preset initial packet identifier, a time stamp of the target data packet, and a target data slice to which the target data packet belongs. The preset initial packet identifier is "F=1" in the schematic diagram of encapsulation shown in FIG. 3, to be more specific, a value of an initial packet identifier field of the first RTP packet of any data slice. There may be more than one data packet whose initial packet identifier is the preset initial packet identifier. When there are a plurality of data packets whose initial packet identifiers each are the preset initial packet identifier, a data packet with a minimum value of "T" is determined as the target data packet. The FCC server obtains a time stamp of the first data packet of the last data slice in the currently received low bit rate media stream of the target channel. If the time stamp of the first data packet is the same as the time stamp of the target data packet, the last data slice in the low bit rate media stream of the target channel is determined as the low bit rate alignment data slice, and the target data slice is determined as the source bit rate alignment data slice.

Figure 7:
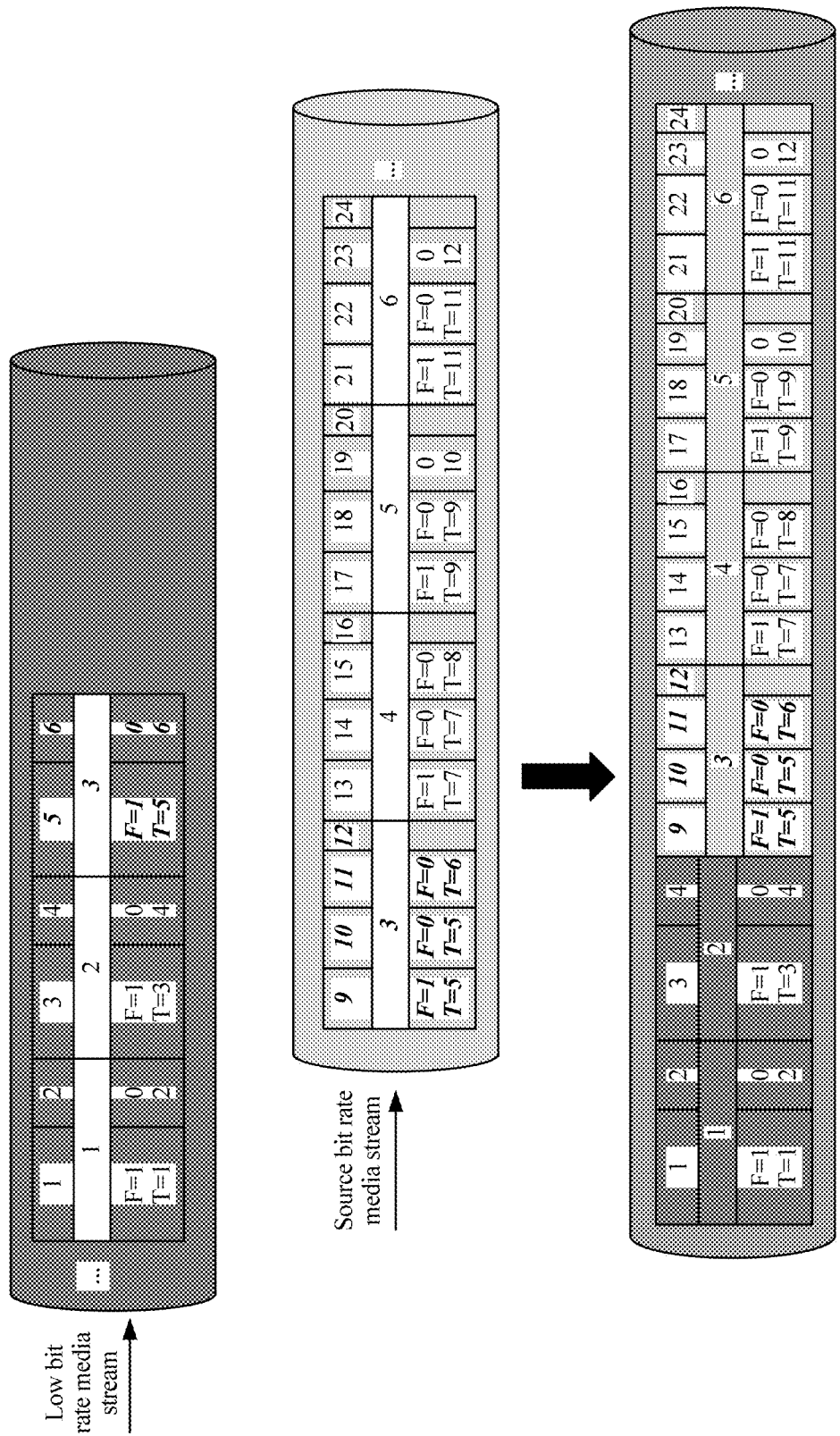
FIG. 7 is a schematic diagram of splicing two media streams according to an embodiment of the present disclosure.

FIG. 7 is a schematic diagram of splicing two media streams according to an embodiment of the present disclosure. For a data slice 3 of the source bit rate media stream, "F=1, and T=5", a time stamp of the first RTP packet 5 of the last data slice 3 of the low bit rate media stream is "T=5", and the two time stamps are the same. In this case, the data slice 3 of the low bit rate media stream is determined as the low bit rate alignment data slice, and the data slice 3 of the source bit rate media stream is determined as the source bit rate alignment data slice, namely, data slices in which italic bold fonts are located in FIG. 7. It may be understood that, media content of the data slice 3 of the low bit rate media stream is the same as that of the data slice 3 of the source bit rate media stream, and the two data slices 3 are a same data slice. It should be noted that, the schematic diagram of splicing shown in FIG. 7 is merely an example, and does not constitute any limitation on this embodiment of the present disclosure.

If the time stamp of the first data packet is different from the time stamp of the target data packet, the playback device continues to read, from the currently received source bit rate media stream of the target channel, an RTP packet in which "F=1", a time stamp of the RTP packet, and a data slice to which the RTP packet belongs; and obtains the time stamp of the first data packet of the last data slice of the currently received low bit rate media stream of the target channel. If the time stamp of the first data packet in this case is the same as the time stamp of the RTP packet, the low bit rate alignment data slice and the source bit rate alignment data slice may be determined. If the time stamp of the first data packet in this case is different from the time stamp of the RTP packet, re-searching is performed according to the foregoing procedure, until the low bit rate alignment data slice and the source bit rate alignment data slice are determined.

When the playback device determines the low bit rate alignment data slice and the source bit rate alignment data slice, the playback device splices, behind a previous data slice of the low bit rate alignment data slice, the source bit rate media stream that is of the target channel and that starts from the source bit rate alignment data slice. Referring to FIG. 7, the low bit rate alignment data slice is the data slice 3 in the low bit rate media stream, the source bit rate alignment data slice is the data slice 3 in the source bit rate media stream, and after the source bit rate media stream that starts from the data slice 3 in the source bit rate media stream is spliced behind a data slice 2 in the low bit rate media stream, a media stream to which a large black arrow shown in FIG. 7 points is obtained. It can be learned from FIG. 7 that, the spliced media stream is continuous. Therefore, the low bit rate media stream and the source bit rate media stream are seamlessly spliced.

The playback device sends a sending stop notification to the FCC server when completing the splicing. When receiving the sending stop notification, the FCC server stops sending the low bit rate media stream of the target channel to the playback device.

The playback device feeds the spliced media stream into a playback stream pipeline, for continuous playing. At this point, this channel change is completed. The low bit rate media stream of the target channel and the source bit rate media stream of the target channel are seamlessly spliced. Therefore, when changing from the low bit rate media stream of the target channel to the source bit rate media stream of the target channel, the playback device can smoothly perform playing, and a user does not perceive an interruption or a change of the media streams.

In Embodiment 1 shown in FIG. 6, the FCC server quickly sends the low bit rate media stream at the high rate, such that a channel change speed can be improved, a channel change time can be reduced, and a bandwidth can be saved.

FIG. 8 is a schematic flowchart of a channel changing method according to Embodiment 2 of the present disclosure. The method includes but is not limited to the following steps.

Step S201: A playback device sends, to an FCC server, a channel change request for a change to a target channel.

Step S202: The FCC server receives the channel change request.

Step S203: The FCC server quickly sends a low bit rate media stream of the target channel to the playback device at a preset high rate.

Step S204: The playback device receives the low bit rate media stream of the target channel that is quickly sent by the FCC server, for playing.

For an implementation process of step S201 to step S204 in Embodiment 2 of the present disclosure, refer to descriptions of step S101 to step S104 in Embodiment 1 of the present disclosure. Details are not described herein again.

Step S205: The FCC server applies to a head end device for joining a multicast group of the target channel.

For example, when the FCC server starts to quickly send the low bit rate media stream of the target channel to the playback device, the FCC server applies to the head end device for joining the multicast group of the target channel, or the FCC server may apply to the head end device for joining the multicast group of the target channel in a process of quickly sending the low bit rate media stream of the target channel to the playback device.

Step S206: The head end device sends a source bit rate media stream of the target channel to the FCC server.

For example, when receiving a join request sent by the FCC server, the head end device adds the FCC server to the multicast group of the target channel, and multicasts the source bit rate media stream of the target channel to the FCC server.

Step S207: The FCC server receives the source bit rate media stream of the target channel.

For example, after joining the multicast group of the target channel, the FCC server receives the source bit rate media stream of the target channel from the head end device.

Step S208: The FCC server splices the source bit rate media stream of the target channel and the low bit rate media stream of the target channel.

A process in which the FCC server splices the source bit rate media stream of the target channel and the low bit rate media stream of the target channel is the same as a process in which the playback device performs splicing in Embodiment 1 of the present disclosure. For details, refer to descriptions of a splicing process in step S108 in Embodiment 1 of the present disclosure. Details are not described herein again.

Step S209: The FCC server quickly sends, to the playback device at the preset high rate, a spliced target media stream.

The target media stream may be a media stream to which a large black arrow shown in FIG. 7 points. The FCC server quickly sends the target media stream to the playback device at the preset high rate.

Step S210: The FCC server sends the target media stream to the playback device at a preset normal rate.

For example, the preset high rate at which the FCC server performs quick sending to the playback device is higher than a rate at which the head end device performs sending to the playback device. Therefore, when or after completing quick sending of a source bit rate alignment data slice, the FCC server stops quick sending of the target media stream to the playback device at the preset high rate, but quickly sends the target media stream to the playback device at the preset normal rate. For example, the preset high rate is three times the sending rate of the head end device, and the preset normal rate is 1·N times the sending rate of the head end device.

A time period in or after which quick sending of the source bit rate alignment data slice is completed may be referred to as a preset time period. A specific value of this period of time is set by a manufacturer of the FCC server, and is not limited herein. Optionally, the preset time period is a time period, where an interval time between the time period and a quick sending completion time point of the source bit rate alignment data slice is less than a threshold.

Step S211: The FCC server sends a quick-sending end notification to the playback device.

For example, the FCC server sends the quick-sending end notification to the playback device when or after quick sending of the source bit rate alignment data slice is completed. The quick-sending end notification is used to inform the playback device that the quick sending is about to end, and instruct the playback device to immediately apply to the head end device for joining the multicast group of the target channel, to receive the source bit rate media stream of the target channel from the head end device.

It should be noted that, step S210 and step S211 are performed at the same time.

Step S212: The playback device receives the target media stream that is quickly sent by the FCC server, for playing.

For example, the playback device first receives the target media stream quickly sent by the FCC server at the preset high rate, and then receives the target media stream quickly sent by the FCC server at the preset normal rate.

Step S213: The playback device receives the quick-sending end notification.

Step S214: The playback device applies to the head end device for joining the multicast group of the target channel.

Step S215: The head end device sends the source bit rate media stream of the target channel to the playback device.

Step S216: The playback device receives the source bit rate media stream of the target channel.

For an implementation process of step S214 to step S216 in Embodiment 2 of the present disclosure, refer to descriptions of step S107 to step S109 in Embodiment 1 of the present disclosure. Details are not described herein again. It should be noted that, there is a time difference between the source bit rate media stream of the target channel received by the playback device in step S216 and the source bit rate media stream of the target channel received by the FCC server in step S207.

The playback device sends a sending stop notification to the FCC server when receiving the source bit rate media stream of the target channel sent by the head end device. The FCC server stops sending the target media stream to the playback device when receiving the sending stop notification.

Optionally, the sending stop notification carries identification information of the first RTP packet of the source bit rate media stream of the target channel received from the head end device, and the identification information may be an RTP packet sequence number, a time stamp, or the like. When receiving the sending stop notification, the FCC server determines, using a method such as comparing values of RTP packet sequence numbers or time stamps, whether all RTP packets before the first RTP packet have been sent to the playback device. If a determining result is no, the FCC server continues to perform sending to the playback device. If the determining result is yes, the FCC server stops performing sending to the playback device.

Step S217: The playback device splices the target media stream and the source bit rate media stream of the target channel and performs playing.

Figure 9:
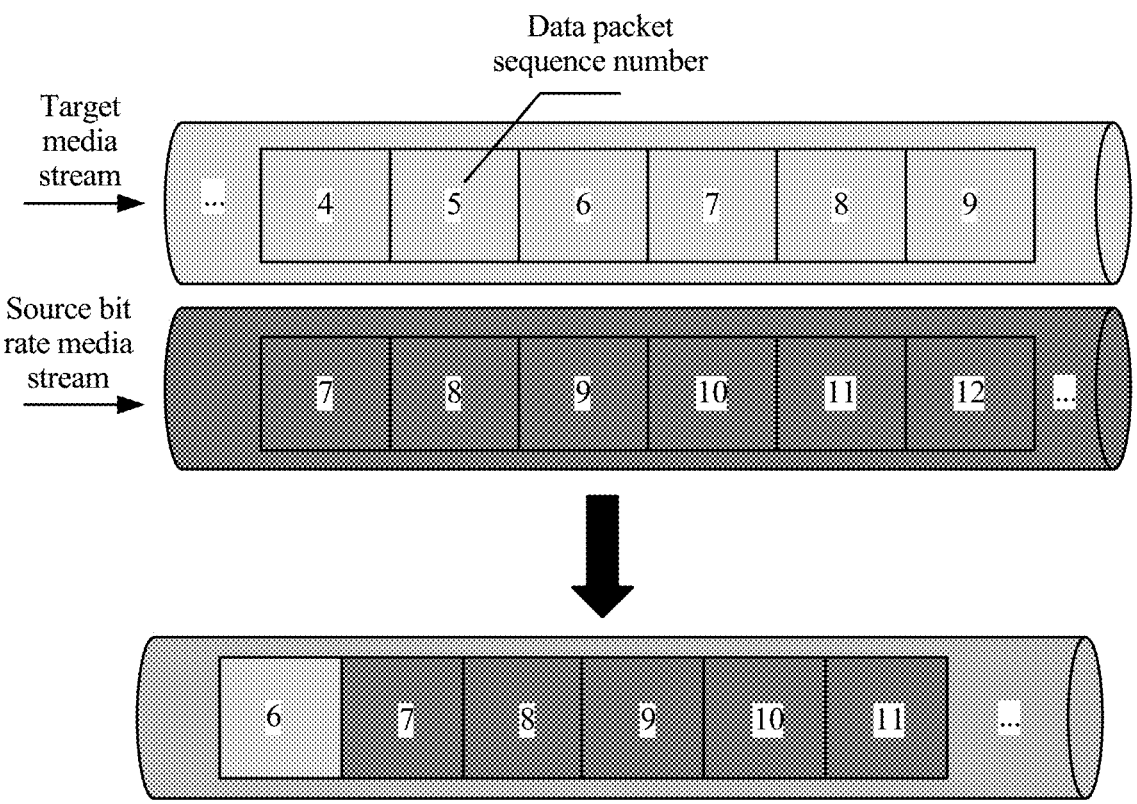
FIG. 9 is a schematic diagram of splicing based on data packet sequence numbers.

For example, the playback device performs splicing and playing based on RTP packet sequence numbers or time stamps of the target media stream and the source bit rate media stream of the target channel that are currently received. FIG. 9 is a schematic diagram of splicing based on data packet sequence numbers. Data packets that start from a data packet 7 in the source bit rate media stream are spliced behind a data packet 6 in the target media stream.

Figure 8A:
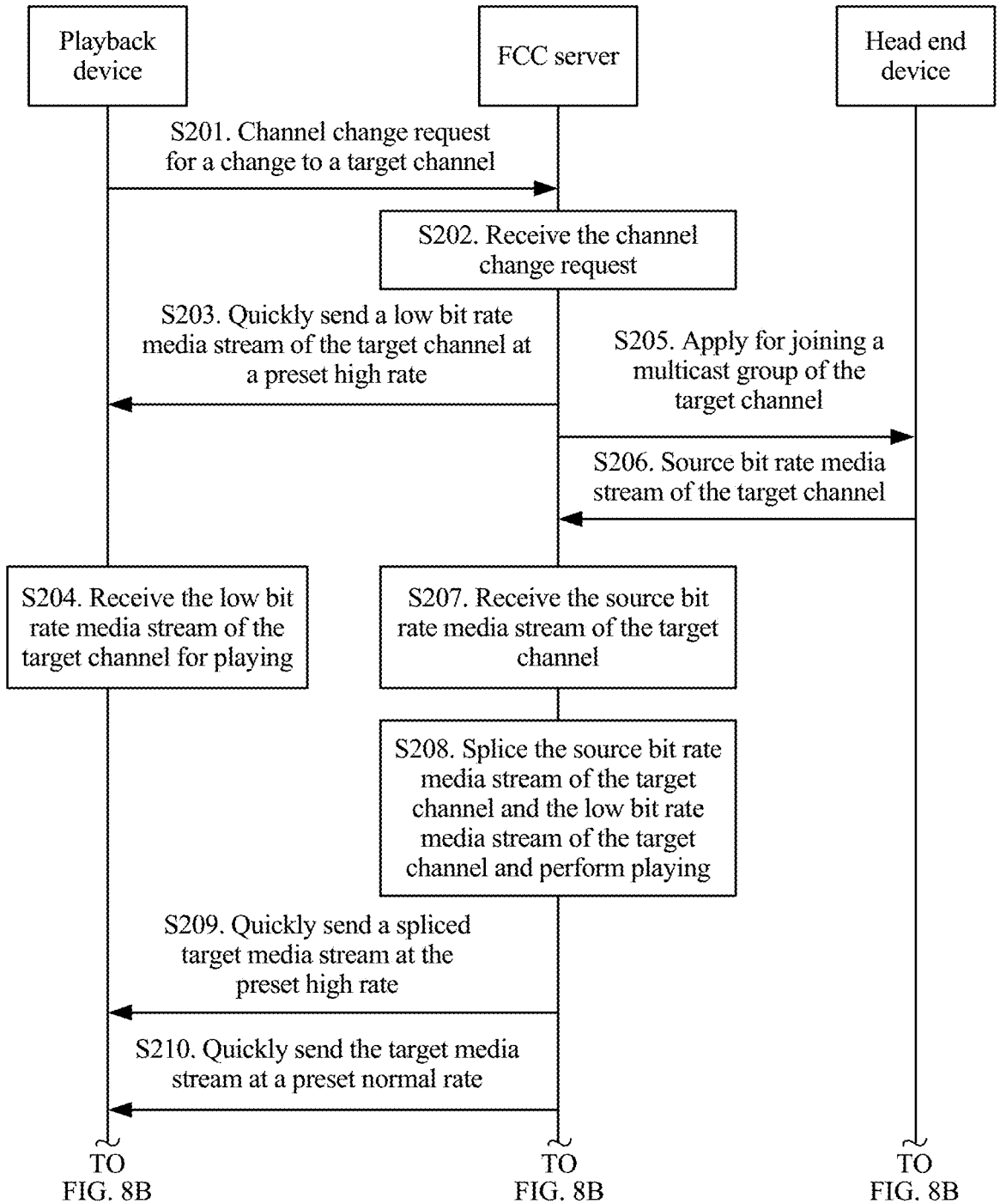
FIG. 8A and FIG. 8B are schematic flowcharts of a channel changing method according to Embodiment 2 of the present disclosure.
Figure 8B:
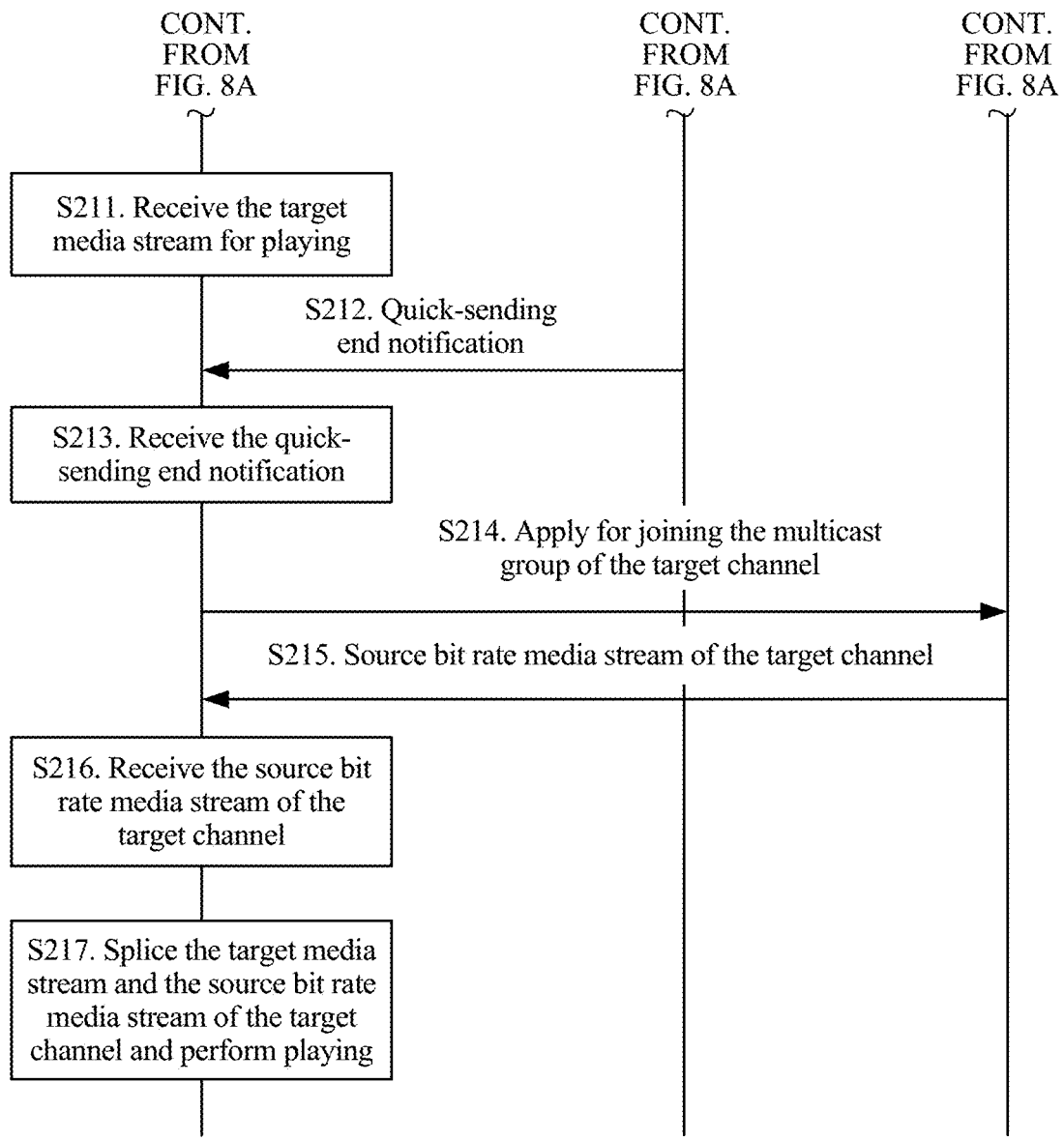

In Embodiment 2 shown in FIG. 8A and FIG. 8B, the FCC server quickly sends the low bit rate media stream at the high rate, such that a channel change speed can be improved, a channel change time can be reduced, and a bandwidth can be saved.

It should be noted that, in Embodiment 1 shown in FIG. 6, the playback device seamlessly splices the low bit rate media stream and the source bit rate media stream, and both the FCC server and the playback device are changed; in Embodiment 2 shown in FIG. 8A and FIG. 8B, the FCC server seamlessly splices the low bit rate media stream and the source bit rate media stream, and the FCC server is changed.

Figure 10:
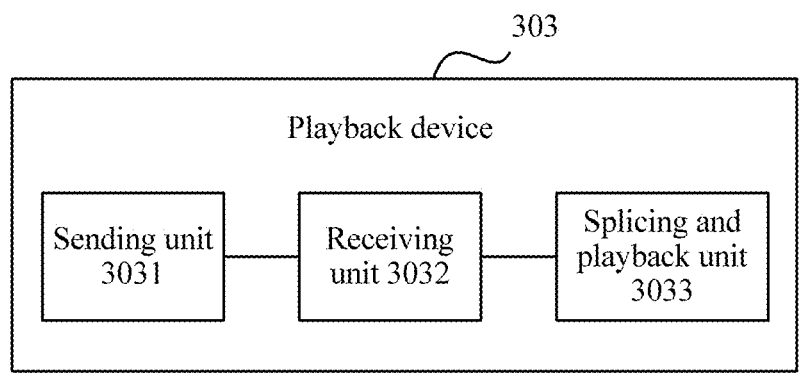
FIG. 10 is a schematic diagram of a logic structure of a playback device according to an embodiment of the present disclosure.

FIG. 10 is a schematic diagram of a logic structure of a playback device according to an embodiment of the present disclosure. The playback device 303 shown in FIG. 10 includes a sending unit 3031, a receiving unit 3032, and a splicing and playback unit 3033.

In a first possible implementation, the sending unit 3031 is configured to send, to an FCC server, a channel change request for a change to a target channel. The receiving unit 3032 is configured to receive a low bit rate media stream of the target channel that is quickly sent by the FCC server, for playing. The receiving unit 3032 is further configured to receive a source bit rate media stream of the target channel from a head end device when receiving a quick-sending end notification sent by the FCC server. The splicing and playback unit 3033 is configured to splice the source bit rate media stream of the target channel and the low bit rate media stream of the target channel and perform playing.

It should be noted that, the sending unit 3031 is configured to implement step S101 in the embodiment shown in FIG. 6; the receiving unit 3032 is configured to implement step S104, step S106, and step S109 in the embodiment shown in FIG. 6; and the splicing and playback unit 3033 is configured to implement step S110 in the embodiment shown in FIG. 6.

In a second possible implementation, the sending unit 3031 is configured to send, to an FCC server, a channel change request for a change to a target channel. The receiving unit 3032 is configured to receive a low bit rate media stream of the target channel that is quickly sent by the FCC server, for playing. The receiving unit 3032 is further configured to receive a spliced target media stream sent by the FCC server for playing. The receiving unit 3032 is further configured to receive a source bit rate media stream of the target channel from a head end device when receiving a quick-sending end notification sent by the FCC server. The splicing and playback unit 3033 is configured to splice the source bit rate media stream of the target channel and the low bit rate media stream of the target channel and perform playing.

It should be noted that, the sending unit 3031 is configured to implement step S201 in the embodiment shown in FIG. 8A; the receiving unit 3032 is configured to implement step S204, step S211, step S213, and step S216 in the embodiment shown in FIG. 8A and FIG. 8B; and the splicing and playback unit 3033 is configured to implement step S217 in the embodiment shown in FIG. 8B.

The sending unit 3031 and the receiving unit 3032 shown in FIG. 10 correspond to the transceiver 1032 of the playback device shown in FIG. 4, and the splicing and playback unit 3033 shown in FIG. 10 corresponds to the processor 1031 of the playback device shown in FIG. 4.

Figure 11:
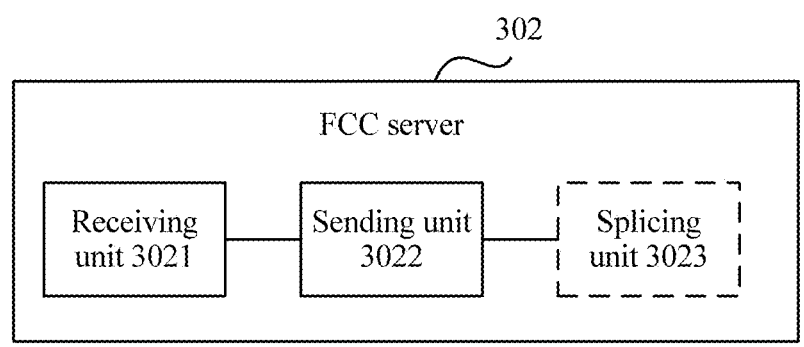
FIG. 11 is a schematic diagram of a logic structure of an FCC server according to an embodiment of the present disclosure.

FIG. 11 is a schematic diagram of a logic structure of an FCC server according to an embodiment of the present disclosure.

In a first possible implementation, the FCC server 302 shown in FIG. 11 includes a receiving unit 3021 and a sending unit 3022. The receiving unit 3021 is configured to receive a channel change request sent by a playback device for a change to a target channel. The sending unit 3022 is configured to quickly send a low bit rate media stream of the target channel to the playback device at a preset high rate. The sending unit 3022 is further configured to send a quick-sending end notification to the playback device, where the quick-sending end notification is used to instruct the playback device to receive a source bit rate media stream of the target channel from a head end device.

It should be noted that, the receiving unit 3021 is configured to implement step S102 in the embodiment shown in FIG. 6, and the sending unit 3022 is configured to implement step S103 and step S105 in the embodiment shown in FIG. 6.

In a second possible implementation, the FCC server 302 shown in FIG. 11 includes a receiving unit 3021, a sending unit 3022, and a splicing unit 3023.

The receiving unit 3021 is configured to receive a channel change request sent by a playback device for a change to a target channel. The sending unit 3022 is configured to quickly send a low bit rate media stream of the target channel to the playback device at a preset high rate. The receiving unit 3021 is further configured to receive a source bit rate media stream of the target channel from a head end device. The splicing unit 3023 is configured to splice the source bit rate media stream of the target channel and the low bit rate media stream of the target channel. The sending unit 3022 is further configured to quickly send a spliced target media stream to the playback device at the preset high rate. The sending unit 3022 is further configured to send a quick-sending end notification to the playback device, and quickly send the target media stream to the playback device at a preset normal rate, where the quick-sending end notification is used to instruct the playback device to receive the source bit rate media stream of the target channel from the head end device, and the preset high rate is higher than the preset normal rate.

It should be noted that, the receiving unit 3021 is configured to implement step S202 and step S207 in the embodiment shown in FIG. 8A; the sending unit 3022 is configured to implement step S203, step S209, step S210, and step S212 in the embodiment shown in FIG. 8A and FIG. 8B; and the splicing unit 3023 is configured to implement step S208 in the embodiment shown in FIG. 8A.

The receiving unit 3021 and the sending unit 3022 shown in FIG. 11 correspond to the transceiver 1022 of the FCC server shown in FIG. 5, and the splicing unit 3023 shown in FIG. 11 corresponds to the processor 1021 of the FCC server shown in FIG. 5.

It should be noted that, the first possible implementation of FIG. 10 and the first possible implementation of FIG. 11 are combined to implement the embodiment shown in FIG. 6, and the second possible implementation of FIG. 10 and the second possible implementation of FIG. 11 are combined to implement the embodiment shown in FIG. 8A and FIG. 8B.

All or some of the foregoing embodiments may be implemented using software, hardware, firmware, or any combination thereof. When software is used to implement the embodiments, the embodiments may be implemented completely or partially in a form of a computer program product. The computer program product includes one or more computer instructions. When the computer instructions are loaded and executed on a computer, all or some of the procedures or functions according to the embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center wiredly (for example, using a coaxial cable, an optical fiber, or a digital subscriber line (DSL)) or wirelessly (for example, through infrared, radio, or microwave). The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD (Digital Video Disk), a semiconductor medium (for example, a solid state disk (SSD)), or the like.

What is claimed is:

1. A channel changing method implemented by a playback device to a fast channel change (FCC) server, the channel changing method comprising:
   sending a channel change request to the FCC server, wherein the channel change request is a request for a change to a target channel;
   receiving a low bit rate media stream of the target channel from the FCC server;
   receiving a quick-sending end notification from the FCC server in a separate transmission than the low bit media stream, wherein the quick-sending end notification informs the playback device that transmission of the low bit rate media stream is about to end, and wherein the quick-sending end notification is received from the FCC server in a time period;
   receiving a source bit rate media stream of the target channel from a head end device after receiving the quick-sending end notification from the FCC server;
   determining a low bit rate alignment data slice and a source hit rate alignment data slice based on initial packet detection information of data packets of the source bit rate media stream and the low bit rate media stream, wherein an interval between the time period and a quick sending completion time point of the source bit rate alignment data slice is less than a threshold;

splicing the source bit rate media stream and the low bit rate media stream to create a spliced target media stream; and playing the spliced target media stream.

2. The method according to claim 1, wherein splicing the source bit rate media stream and the low bit rate media stream comprises splicing, behind a previous data slice of the low bit rate alignment data slice, the source bit rate media stream that starts from the source bit rate alignment data slice to obtain a continuous spliced media stream.

3. The method according to claim 2, wherein the initial packet detection information comprises an initial packet identifier and a time stamp.

4. The method according to claim 3, wherein determining the low bit rate alignment data slice and the source bit rate alignment data slice based on the initial packet detection information comprises:

obtaining, from the source bit rate media stream, a target data packet whose initial packet identifier is a preset initial packet identifier, a time stamp of the target data packet, and a target data slice to which the target data packet belongs;

obtaining a time stamp of a first data packet of a last data slice in the low bit rate media stream;

determining the last data slice of the low bit rate media stream as the low bit rate alignment data slice; and determining the target data slice as the source bit rate alignment data slice when the time stamp of the first data packet is the same as the time stamp of the target data packet.

5. The method according to claim 1, further comprising sending a sending stop notification to the FCC server after completing the splicing.

6. The method according to claim 5, wherein the sending stop notification instructs the FCC server to stop sending the low bit rate media stream to the playback device.

7. A playback device comprising:

a processor configured to:

splice a source bit rate media stream of a target channel and a low bit rate media stream of the target channel and perform playing; and determine a low bit rate alignment data slice and a source bit rate alignment data slice based on initial packet detection information of data packets of the source bit rate media stream and the low bit rate media stream; and a transceiver configured to:

send, to a fast channel change (FCC) server, a channel change request for a change to the target channel;

receive the low bit rate media stream of the target channel from the FCC server;

receive a quick-sending end notification from the FCC server in a separate transmission than the low bit media stream, wherein the quick-sending end notification informs the playback device that transmission of the low bit rate media stream is about to end, wherein the transceiver is further configured to receive the quick-sending end notification from the FCC server in a time period, and wherein an interval between the time period and a quick sending completion time point of the source bit rate alignment data slice is less than a threshold; and receive the source bit rate media stream from a head end device after receiving the quick-sending end notification from the FCC server.

8. The playback device according to claim 7, wherein the processor is configured to: splice, behind a previous data slice of the low bit rate alignment data slice, the source bit rate media stream to obtain a continuous spliced media stream.

9. The playback device according to claim 8, wherein the initial packet detection information comprises an initial packet identifier and a time stamp.

10. The playback device according to claim 9, wherein the processor is configured to:

obtain, from the source bit rate media stream, a target data packet whose initial packet identifier is a preset initial packet identifier, a time stamp of the target data packet, and a target data slice to which the target data packet belongs;

obtain a time stamp of a first data packet of a last data slice in the low bit rate media stream; and when the time stamp of the first data packet is the same as the time stamp of the target data packet, determine the last data slice of the low bit rate media stream as the low bit rate alignment data slice and determine the target data slice as the source bit rate alignment data slice.

11. The playback device according to claim 7, wherein the transceiver is further configured to send a sending stop notification to the FCC server when the splicing is completed.

12. The playback device according to claim 11, wherein the sending stop notification instructs the FCC server to stop sending the low bit rate media stream to the playback device.

13. The playback device according to claim 7, wherein the target channel is a live broadcast channel.

14. The playback device according to claim 7, wherein the playback device is configured to receive the quick-sending end notification from the FCC server when a sending progress of the low bit rate media stream of the target channel almost catches up with a live broadcast progress of the source bit rate media stream of the target channel.

15. The playback device according to claim 7, wherein the playback device receives the low bit rate media stream from the FCC server at a higher transmission rate than that at which the playback device receives the source bit rate media stream from the head end device.

16. The playback device according to claim 15, wherein the low bit rate media stream has a lower bit rate than that of the source bit rate media stream.

17. The playback device according to claim 15, wherein the low bit rate media stream is locally buffered by the FCC server such that there is a time difference between the low bit rate media stream and the source bit rate media stream of the target channel, and wherein the playback device is configured to receive the low bit rate media stream from the FCC server at the higher transmission rate to compensate for the time difference.

18. The playback device according to claim 7, wherein the quick-sending end notification instructs the playback device to immediately apply to the head end device for joining a multicast group of the target channel to receive the source bit rate media stream.

* * * * *

UNITED STATES PATENT AND TRADEMARK OFFICE
CERTIFICATE OF CORRECTION

PATENT NO.        : 11,039,203 B2
APPLICATION NO.   : 16/564432
DATED             : June 15, 2021
INVENTOR(S)       : Gang Xing, Zhibing Wang and Zhigang Wei It is certified that error appears in the above-identified patent and that said Letters Patent is hereby corrected as shown below:

In the Claims

Claim 1, Column 22, Line 64: "source hit rate" should read "source bit rate"

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*